Figure 1:
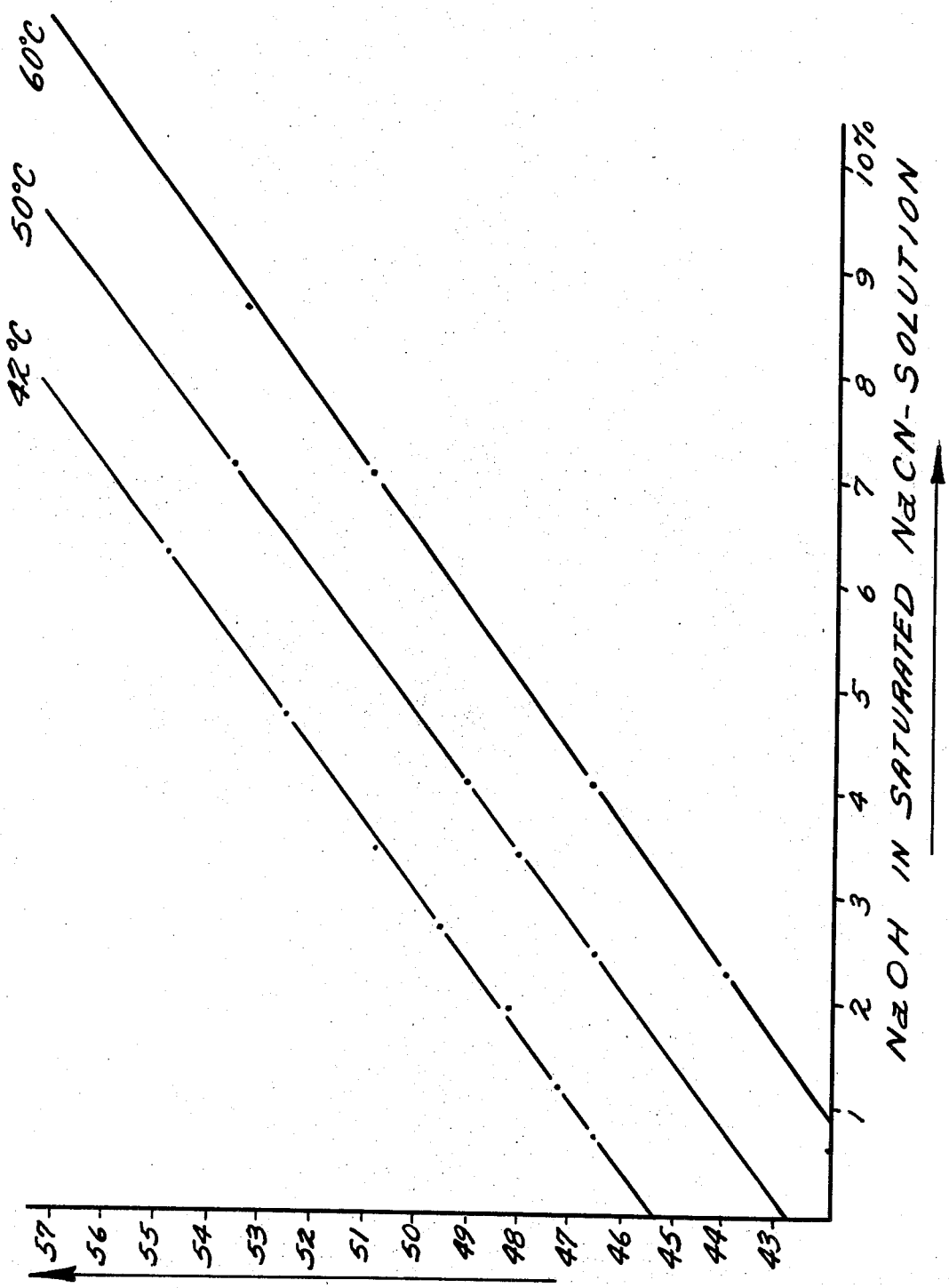

United States Patent

Kobs et al.

[15] 3,653,820
[45] Apr. 4, 1972

[54] PROCESS FOR CONTROLLING THE PRODUCTION OF ALKALI CYANIDE SOLUTIONS

[72] Inventors: Hans-Dietrich Kobs, Surth; Klaus Schmidt, Bruhl; Theodor Zarfl, Wesseling; Gunter Kuhn, Cologne-Zollstock, all of Germany

[73] Assignee: Deutsche Gold-und Silber, Scheideanstalt vormals Raessler, Frankfurt Main, Germany

[22] Filed: Feb. 17, 1969

[21] Appl. No.: 799,570

[30] Foreign Application Priority Data

Feb. 24, 1968    Germany......................P 16 67 785.3

[52] U.S. Cl. ....................................23/79, 23/1 B, 23/253 R
[51] Int. Cl. ....................C01c 3/10, C01g 1/00, G01n 33/00
[58] Field of Search.................................23/79, 1 B, 253 R

[56] References Cited

UNITED STATES PATENTS

| | | | |
|---|---|---|---|
| 2,993,754 | 7/1961 | Jenks et al. | 23/79 |
| 3,079,239 | 2/1963 | McLane | 23/79 |
| 2,904,401 | 9/1959 | Booth | 23/230 A |

*Primary Examiner*—Oscar R. Vertiz
*Assistant Examiner*—Hoke S. Miller
*Attorney*—Cushman, Darby and Cushman

[57] ABSTRACT

The continuous production of aqueous alkali cyanide from hydrocyanic acid and aqueous alkali is controlled by measuring the viscosity and adding alkali or hydrocyanic acid to keep the viscosity constant. An Apparatus for carrying out the method is also disclosed. The lines for adding hydrocyanic acid and alkali are controlled through the viscosity measuring mechanism.

6 Claims, 2 Drawing Figures

INVENTORS
HANS-DIETRICH KOBS
KLAUS SCHMIDT
THEODOR ZARFL
GUNTER KÜHN
BY Cushman, Darby & Cushman
ATTORNEYS

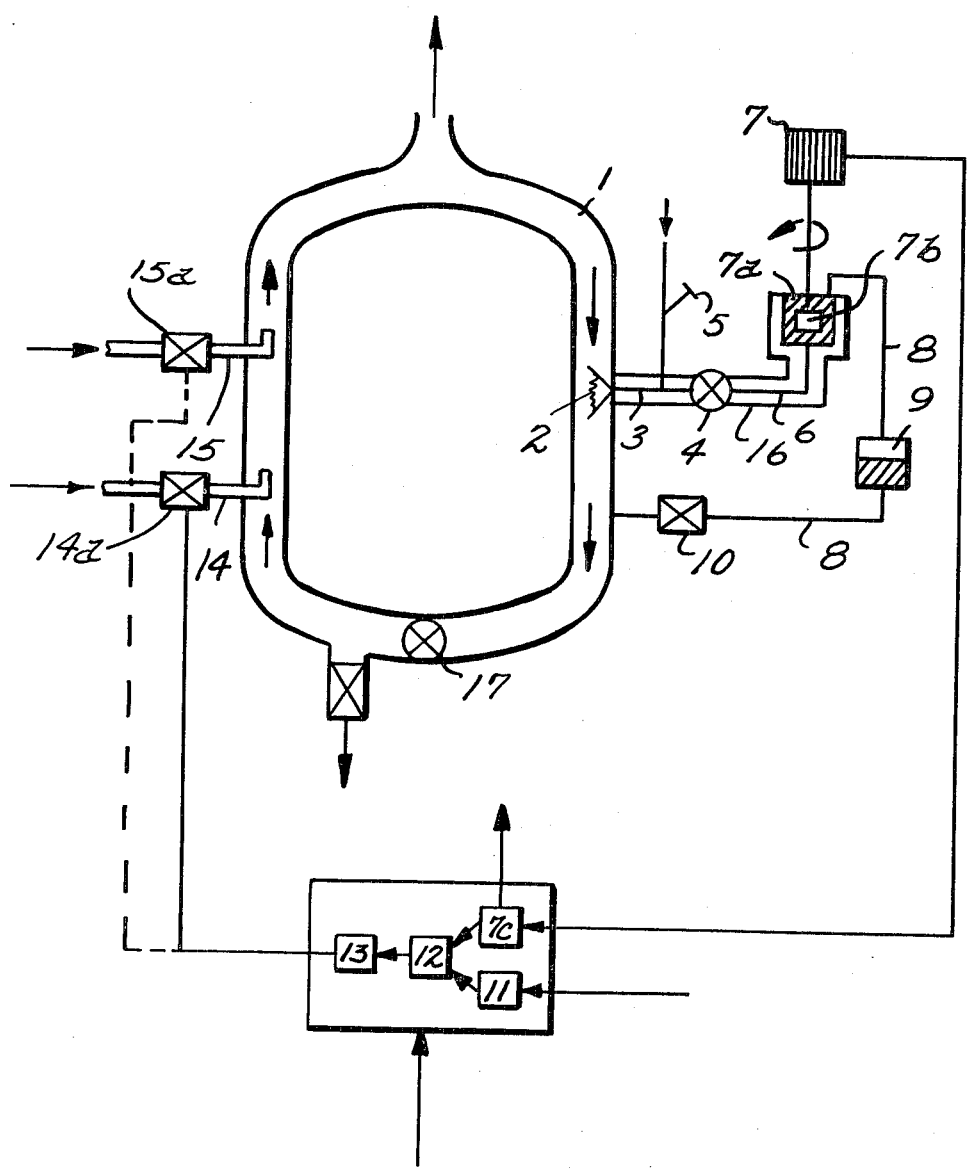

PROCESS FOR CONTROLLING THE PRODUCTION OF ALKALI CYANIDE SOLUTIONS

The invention concerns a process for the automatic control of the continuous production of aqueous alkali cyanide solutions from hydrocyanic acid or hydrocyanic acid-containing gases with aqueous alkali. It is further concerned with an apparatus for carrying out the process.

For the production of alkali cyanides, e.g., potassium cyanide or sodium cyanide, according to the so-called wet process, one causes hydrocyanic acid or hydrocyanic acid-containing gases, for example, to react with aqueous alkali, e.g., sodium hydroxide or potassium hydroxide, evaporates the aqueous alkali cyanide solution and separates the salt from the mother liquor, for example, by filtration.

One works continously with a small excess of alkali for the reaction because solutions with an excess of hydrocyanic acid easily decompose, accompanied by irreversible darkening. For the most part the reaction is carried out so that 0.3 to 1 percent alkali hydroxide remains in the solution of the reaction product. Higher alkali excesses are to be avoided because otherwise the solid cyanide produced becomes strongly contaminated with alkali hydroxide. The necessary alkali excess for the reaction must therefore be exactly controlled. In order to continuously carry out the production, the necessity exists to control the feeding of the reaction components according to the composition of the solution.

Since this control must take place as much as possible inertia free, known discontinuous processes for the analysis of the solution of the reaction products, as for example, volumetric determination procedures or conductivity measurements in the vicinity of the end point are unsuited for continuous control. It has also already been proposed, to carry out the reaction with control of the acid or lye content of the reaction solution by means of a potentiometric measurement and to control the addition of the reaction components according to the voltage produced.

The potentiometric method has decided disadvantages because concentration changes above 0.5 weight % NaOH can be detected only with difficulty or not at all because of the small changes in potential. In continuous manufacturing processes the limit of 0.5 weight % NaOH in the cyanide liquor is already critical with regard to the mentioned polymerization phenomena. Furthermore, especially at higher cyanide concentrations and higher temperatures ($\gtrsim 50°$ C.), the entire graph of the potential measurement of the aging of the glass electrode shifts over a longer period of time. A direct measurement is thereby made difficult.

The invention is therefore based on the problem of avoiding the mentioned disadvantages of the known processes and of finding a way to accomplish control of the reaction in a wide range of applications, simply, exactly and trouble free.

This problem is solved according to the invention if one allows the reaction components to be dependent on the alkali content of the solution of the reaction products whereby one controls the alkali content, if necessary after filtration of crystallized cyanide, through measurement of viscosity.

In a suitable manner the temperature of the solution of the reaction products is held constant for the viscosity measurement, for example by a thermostat.

One can also electronically compensate with a simple electrical circuit different measuring results obtained at different temperatures of the solution of the reaction products, so that within a predetermined temperature region comparable results of measurement are obtained independent of fluctuations in temperature.

The reaction can be carried out so that the alkali concentration is regulated by constant addition of hydrocyanic acid. One can also maintain the NaOH addition.

The process of the invention also permits the alkali content of the cyanide liquor to be determined directly and continuously on the basis of the differentiation in viscosity. Viscosity changes in the solution of the reaction products can then be instaneously converted by means of known controlling devices into corresponding control pulses for the device for metering the reaction components. Solid cyanide, which separates easily from the saturated solution, influences the measurement and must be separated previously through a filter.

In contrast to the potentiometric measurement the viscosity measurement is usable in every concentration range. For example, it can detect concentration changes at a sodium hydroxide content of 10 weight percent. Besides the viscosity measurement is also essentially insensitive for continuous operation at high cyanide concentration and higher temperatures (e.g., 40° to 60° C). Besides the linear measurement value relationship offers the greatest possible accuracy over the concentration range concerned, especially in contrast to conductivity measurements of alkaline, highly concentrated cyanide solutions.

The invention also is concerned with an apparatus for carrying out the control process of the invention. The apparatus is designed to provide a reactor loop including reaction and withdrawal zones. An apparatus such as in the subject of Mann et al., United States patent application entitled "Process for the Production of Alkali Cyanides," filed Oct. 28, 1968 is usable. This apparatus is arranged to include valve regulated feed pipes for liquid and gaseous reaction components before the reaction zone and valve regulated pipes for the removal of the reaction product containing solution in the withdrawal zone. It comprises a self cleaning filter disposed in the withdrawal zone. The filter is in communication with a pipe having a cock and this pipe is in communication with the suction side of a pump outside the reactor. The pressure side of the pump is connected by a further pipe to a viscosity measuring apparatus which possesses an overflow and return line to the reaction zone of the reactor loop. The indicator part of the measuring divice is connected to the control means for the valves of the liquid or the gas feed pipes.

To eliminate temperature fluctuations, which would influence the viscosity measured, the viscosity measuring apparatus, as well as the pipes leading to it from the reactor, can be provided with a thermostatically regulated heating means. As already mentioned, the temperature fluctuations can be compensated electronically over an electrical computer circuit, e.g., for the temperature range 40°–60° C.

It is especially suitable to use a rotation viscosimeter for the determination of the viscosity value. The determination of the relative value of the viscosity is sufficient for the intended purpose. The indication lattitude of rotation viscosimeters, commercially available, can be raised to the necessary size through the use of a correspondingly enlarged rotating body or the installation of more sensitive torsional springs for the ascertainment of the relatively small viscosity differences occurring.

One can also use a Leib viscosimeter to measure the viscosity. In this manner the range of measurement can be determined through the use of correspondingly smaller diffusion capillaries. This viscosimeter has no moveable parts and can also operate in the vacuum range. Thereby the height level of the measuring liquid in the viscosimeter, for example, through an electrical transmitter, can be measured.

The invention will be understood best in connection with the drawings wherein:

FIG. 1 is a graph of the relationship of the viscosity of a saturated NaCN solution to a NaOH content at different temperatures; and FIG. 2 is a schematic illustration of a control apparatus according to the invention in combination with an apparatus for continuously producing cyanide according to the wet process.

Unless otherwise indicated all parts and percentages are by weight.

In the following table there are given the viscosity changes of saturated NaCN solutions through addition of NaOH at various temperatures.

TABLE

| Temperature (° C.) | 41.8 | 41.7 | 41.6 | 41.7 | 42 | 42 | 42.1 |
|---|---|---|---|---|---|---|---|
| Percent NaOH in saturated CN solution | 0.75 | 1.18 | 1.93 | 2.72 | 3.65 | 4.74 | 6.29 |
| Percent NaCN | 43.9 | 44.0 | 42.8 | 41.9 | 41.3 | 40.5 | 38.9 |
| Scale portion | 46 | 47.2 | 48.2 | 49.5 | 50.8 | 52.5 | 54.8 |
| Temperature (° C.) | 50.1 | 50.0 | 50.3 | 50.3 | | | |
| Percent NaOH | 2.44 | 3.4 | 4.1 | 7.14 | | | |
| Percent NaCN | 43.4 | 42.5 | 41.8 | 38.8 | | | |
| Scale portion | 46.5 | 48.0 | 49.0 | 53.5 | | | |
| Temperature (° C.) | 59.8 | 59.8 | 49.8 | 60.2 | 59.8 | 60.0 | |
| Percent NaOH | 0.6 | 2.3 | 4.08 | 5.88 | 7.05 | 8.58 | |
| Percent NaCN | | 44.0 | 42.5 | 41.0 | 39.8 | | |
| Scale portion | 42.0 | 44.0 | 46.5 | 49.5 | 50.8 | 53.2 | |

Fig. 1 is the graphic representation of the values set forth in the table. It can be seen that the increase in viscosity of the cyanide solution is linear with increasing alkali content.

The control apparatus of the invention is arranged in the withdrawal zone of a reactor loop 1 at a partial pressure of 400 to 600 Torr and consists of a self cleaning filter 2 which is in communication with the vacuum connection of the pump 4 through the pipe 3 leading from the reactor. The pipe 3 is provided with a cock 5 between the pump and the reactor which is connected to a protective gas pipe. Any obstructions of the filter occurring during operation can be eliminated when one opens this cock for a short period and back washes the pipe 3 and filter 2, for example, with nitrogen. From the pressure connection of the pump a further pipe 6 leads into the lower part of the measuring compartment 7a of an Eprecht rotation viscosimeter 7 (e.g., Type 1392 TV 25/84The measuring chamber is provided with an overflow in its upper portion. From this, the measuring fluid is lead back to the reaction zone of the reaction loop by means of pipe 8 over a reservoir 9 and the valve 10. As rotor 7b of the viscosimeter there is used an open cylinder measuring 70 × 70 mm.

With this rotor a sufficiently great spreading of the measuring range is obtained in the framework of the described procedure of the viscosity changes occurring in the reaction apparatus. The indicating portion (measuring mechanism) 7c of the viscosimeter is connected with the control means 11, 12, 13 for the regulating valve 14a of the liquid introduction pipe 14 or regulating valve 15a for the gas introduction pipe 15. The measuring mechanism 7c picks up the control magnitude of the element 7 that gives the actual value of the rotation viscosimeter. The control deviation is formed in the recording system 12 as the difference between element 11 that gives the ideal value and element 7c that gives the actual value. The energy delivered from the recording system becomes magnified in amplifier 13 and starts the regulating valves 14a or 15a of the liquid or gas feed pipes 14 or 15.

The pipes 3 and 6 leading from the filter to the viscosity measuring apparatus as well as the measuring chamber of the viscosity measurer are provided with heating jacket 16 containing thermostatically regulated heating liquid.

The manner of operation of the apparatus of the invention will be further explained in the following example in combination with the drawing.

The discharge part of the reactor loop contains a saturated aqueous solution of sodium cyanide containing 10 percent solid matter (NaCN). The pressure in the reactor loop is approximately 500 Torr.

The reaction between hydrocyanic acid and sodium hydroxide solution is carried out so that the beginning concentration of the sodium hydroxide in the solution is 1 percent, the sodium hydroxide concentration after the resulting reaction amounts to 0.6 percent and is controlled through pump 17 at constant liquid through put.

In the withdrawal zone, by means of the vacuum pump 4, a solid free stream portion becomes constantly drawn off through the filter 2 for the determination of the alkali content of the reaciton product containing solution. The rotor of the viscosimeter is constantly working. If the ascertained viscosity corresponds, for example, to an alkali content of the cyanide solution of 0.8 percent, there is introduced either NaOH to the reactor by means of regulator valve 14a in the liquid line 14 appropriately throttled or the HCN through regulator valve 15a in the gas line 15 with the aid of control means 11, 12 and 13 connected to the indicating apparatus 7c.

In place of sodium hydroxide there can be used potassium hydroxide in which case the product is potassium cyanide.

We claim:

1. In a process for the continuous production of an aqueous mixture containing alkali cyanide from hydrocyanic acid or hydrocyanic acid containing gases with aqueous alkali as the reaction components the improvement comprising establishing an alkali content of 0.3 to 1 percent in the product solution, measuring the viscosity of said product solution, and then adjusting the amounts of said reaction components to maintain said alkali content in said product solution as determined by the viscosity measurements.

2. The process according to claim 1 including the step of removing any crystallized cyanide from the solution prior to the viscosity measurement.

3. The process according to claim 1 comprising maintaining the solution of the reaction products at a constant temperature during the viscosity measurement.

4. The process according to claim 1 wherein the temperature is maintained at 40°–60° C.

5. The process according to claim 4 comprising removing any crystallized cyanide from the solution by filtration prior to the viscosity measurement.

6. In a process for the continuous production of aqueous alkali cyanide from hydrocyanic acid or hydrocyanic acid containing gases with aqueous alkali as reaction components the improvement comprising determining the alkali content of the aqueous reaction mixture by measuring the viscosity thereof and controlling the amounts of reaction components added to maintain an alkali content of 0.3 to 1 percent.

* * * * *